(12) United States Patent
Hseush et al.

(10) Patent No.: US 10,353,881 B2
(45) Date of Patent: Jul. 16, 2019

(54) DATA PROCESSING APPARATUS, METHOD, AND NON-TRANSITORY TANGIBLE MACHINE-READABLE MEDIUM THEREOF FOR RECURSIVELY STRUCTURED DATA

(71) Applicant: BigObject, Inc., Grand Cayman (KY)

(72) Inventors: Wenwey Hseush, Grand Cayman (KY); Yi-Cheng Huang, Grand Cayman (KY); Yu-Chun Lai, Grand Cayman (KY)

(73) Assignee: BigObject Inc., Grand Cayman (KY)

( * ) Notice: Subject to any disclaimer, the term of this patent is extended or adjusted under 35 U.S.C. 154(b) by 492 days.

(21) Appl. No.: 15/157,112

(22) Filed: May 17, 2016

(65) Prior Publication Data

US 2017/0337228 A1    Nov. 23, 2017

(51) Int. Cl.
*G06F 16/22* (2019.01)

(52) U.S. Cl.
CPC .................................... *G06F 16/22* (2019.01)

(58) Field of Classification Search
None
See application file for complete search history.

(56) References Cited

U.S. PATENT DOCUMENTS

2017/0286459 A1 * 10/2017 Chu .................. G06F 17/30312

OTHER PUBLICATIONS

Black, Algorithms and Theory of Computation Handbook: root Dec. 17, 2004, NIST, https://web.archive.org/web/20150906090943/http://xlinux.nist.gov/dads/HTML/root.html.*
Howe, tree Nov. 12, 1998, Free On-Line Dictionary of Computing, http://foldoc.org/tree.*
The Authoritative Dictionary of IEEE Standards Terms: tree 2000, IEEE, p. 1214.*
Knuth, The Art of Computer Programming 1973, Addison-Wesley, vol. 1, p. 305.*

* cited by examiner

*Primary Examiner* — Jason G Liao
(74) *Attorney, Agent, or Firm* — Christensen, Fonder, Dardi & Herbert PLLC

(57) ABSTRACT

Data processing apparatus, method, and non-transitory tangible machine-readable medium thereof for recursively structured data are provided. The data processing apparatus accesses a piece of recursively structured data having a Location Independent Structure and arranges the piece of recursively structured data in a one-dimensional memory space according to $LIS := e^0 \circ e^1 \circ \ldots \circ e^{p-1} \circ LIS^0 \circ LIS^1 \circ \ldots \circ LIS^{p-1}$. The notation $e^i$ represents an element of the piece of recursively structured data. The notation $LIS^i$ represents a sub-LIS of the recursively structured data and corresponds to the element $e^i$. The operator '$\circ$' indicates "contiguous to" in the one-dimensional memory space. When the elements in all depths are of the element size and the LIS sizes of the sub-LISs within the same depth are the same, the piece of recursively structured data is a complete LIS.

15 Claims, 6 Drawing Sheets

DATA PROCESSING APPARATUS, METHOD, AND NON-TRANSITORY TANGIBLE MACHINE-READABLE MEDIUM THEREOF FOR RECURSIVELY STRUCTURED DATA

CROSS-REFERENCES TO RELATED APPLICATIONS

Not applicable.

BACKGROUND OF THE INVENTION

Field of the Invention

The present invention relates to a data processing apparatus, method, and non-transitory tangible machine-readable medium thereof for recursively structured data. More particularly, the present invention relates to a data processing apparatus, method, and non-transitory tangible machine-readable medium thereof for recursively structured data by using a location independent structure.

Descriptions of the Related Art

With the rapid development in computer technologies, most enterprises collect, store, manipulate, and organize business information/data in computers in a systematic way. Relational databases and on-line analytical processing (OLAP) are examples of commonly adopted technologies.

Although various commercial products of relational databases and OLAP have been developed, they have shortcomings when the amount of business data being stored becomes huge. There are occasions that a business manager would like to make a quick decision based on an analytical result of processing a huge amount of data stored in a database. However, databases on the market today cannot provide a quick response when the amount of data being processed is huge. Accessing and analyzing millions or billions records usually take significant amount of time. For business managers that have to perform analysis and make quick decisions based on big data, the long-processing time of the databases on the market today is intolerable.

To solve the aforementioned problems, Applicants have provided a technique for realizing big data into a big object in U.S. application Ser. No. 13/415,622. Briefly speaking, the technique disclosed therein creates a Big Object from the big data using memory mapped files, lays out a content (comprising a meta information section, a tree section, and a data section) of the Big Object, and lays out a content of the tree section by using a Location Independent Structure (LIS). The technique disclosed in U.S. application Ser. No. 13/415,622 can be further improved, which is provided in this patent application.

SUMMARY OF THE INVENTION

An objective of the present invention is to provide a data processing apparatus. The data processing apparatus comprises a one-dimensional memory space and a processor, wherein the processor is electrically connected to the one-dimensional memory space. The processor is configured to access a piece of recursively structured data, wherein the piece of recursively structured data has a Location Independent Structure (LIS). The processor further arranges the piece of recursively structured data in the one-dimensional memory space in the following way:

$$LIS:=e^0 \circ e^1 \circ \ldots \circ e^{p-1} \circ LIS^0 \circ LIS^1 \circ \ldots \circ LIS^{p-1}.$$

The variable p is a positive integer, the notation $e^i$ represents an element of the piece of recursively structured data, the notation $LSI^i$ represents a sub-LIS of the recursively structured data and corresponds to the element $e^i$, the variable i is an index of the elements and is between 0 and p−1, the operator ' ' indicates "contiguous to" in the one-dimensional memory space, each of the sub-LISs is of an LIS size, a depth associated to each sub-LIS is a number of recursions from the top LIS, the depth of each $LIS^i$ equals the depth of the LIS plus one, and the depth of the top LIS is zero. When the elements in all depths are of the element size and the LIS sizes of the sub-LISs within the same depth are the same, the piece of recursively structured data is a complete LIS.

Another objective of the present invention is to provide a data processing method for use in an electronic apparatus. The data processing method comprises the following steps of: (a) accessing a piece of recursively structured data, wherein the piece of recursively structured data has a Location Independent Structure (LIS) and (b) arranging the piece of recursively structured data in a one-dimensional memory space in the following way:

$$LIS:=e^0 \circ e^1 \circ \ldots \circ e^{p-1} \circ LIS^0 \circ LIS^1 \circ \ldots \circ LIS^{p-1}.$$

The variable p is a positive integer, the notation $e^i$ represents an element of the piece of recursively structured data, the notation $LSI^i$ represents a sub-LIS of the recursively structured data and corresponds to the element $e^i$, the variable i is an index of the elements and is between 0 and p−1, the operator '∘' indicates "contiguous to" in the one-dimensional memory space, each of the sub-LISs is of an LIS size, a depth associated to each sub-LIS is a number of recursions from the top LIS, the depth of each of the $LSI^i$ equals the depth of the LIS plus one, and the depth of the top LIS is zero. When the elements in all depths are of the element size and the LIS sizes of the sub-LISs within the same depth are the same, the piece of recursively structured data is a complete LIS.

A further objective of the present invention is to provide a non-transitory tangible machine-readable medium. The non-transitory tangible machine-readable medium is stored with a computer program, wherein the computer program comprises a plurality of codes. The codes are able to execute a data processing method when the computer program is loaded into an electronic apparatus. The data processing method comprises the following steps of: (a) accessing a piece of recursively structured data, wherein the piece of recursively structured data has a Location Independent Structure (LIS) and (b) arranging the piece of recursively structured data in a one-dimensional memory space in the following way:

$$LIS:=e^0 \circ e^1 \circ \ldots \circ e^{p-1} \circ LIS^0 \circ LIS^1 \circ \ldots \circ LIS^{p-1}.$$

The variable p is a positive integer, the notation $e^1$ represents an element of the piece of recursively structured data, the notation $LSI^i$ represents a sub-LIS of the recursively structured data and corresponds to the element $e^i$, the variable i is an index of the elements and is between 0 and p−1, the operator '∘' indicates "contiguous to" in the one-dimensional memory space, each of the sub-LISs is of an LIS size, a depth associated to each sub-LIS is a number of recursions from the top LIS, the depth of each of the $LSI^i$ equals the depth of the LIS plus one, and the depth of the top LIS is zero. When the elements in all depths are of the element size and the LIS sizes of the sub-LISs within the same depth are the same, the piece of recursively structured data is a complete LIS.

The present invention arranges a piece of recursively structured data in a one-dimensional memory space based on a specific way (i.e. LIS:=$e^0 \circ e^1 \circ \ldots \circ e^{p-1} \circ LIS^0 \circ LIS^1 \circ \ldots \circ LIS^{p-1}$). Therefore, sibling locality (i.e. all sibling elements are placed together in the one-dimensional memory space as one contiguous piece) and descendant locality (i.e. all descendant elements of an element are placed together in the one-dimensional memory space as one contiguous piece) of the piece of recursively structured data 10 are maintained. As a result, retrieval and manipulation can be achieved efficiently, especially when the piece of recursively structured data is complete LIS.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the data processing apparatus, method, and non-transitory tangible machine-readable medium thereof of the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

In this patent application, a technique for accessing/processing/managing a piece of recursively structured data by a complete Location Independent Structure (LIS) is provided. The LIS of the present disclosure can be analogized as a tree without a root node. LIS is a strong-locality approach to arranging memory for a data set of elements in a hierarchical (tree) way. With strong locality, relevant data elements are grouped tightly together (without any irrelevant data elements in between) for management and performance purposes. In management, an LIS or its sub-LIS (i.e. sub-component or sub-tree) can be relocated to other memory space as one piece without handling any pointers. This is the reason why LIS is named in the first place. In performance, a big LIS can be accessed and operated efficiently based on the locality principle. LIS is intentionally designed for big data computing.

Figure 1A:
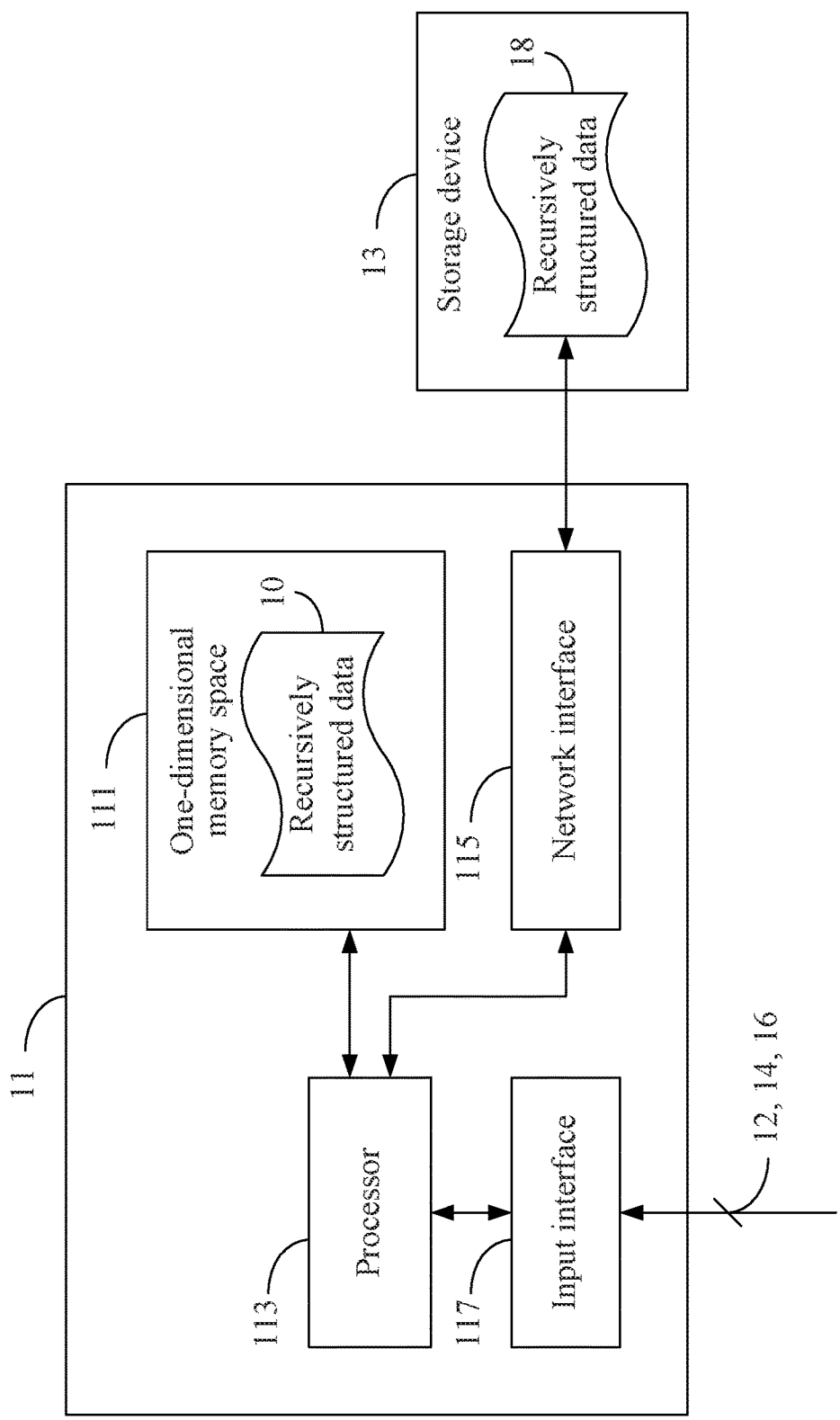
FIG. 1A illustrates the data processing apparatus 11 of the first embodiment.

A first embodiment of the present invention is a data processing apparatus 11, which is illustrated in FIG. 1A. The data processing apparatus 11 comprises a one-dimensional memory space 111, a processor 113, a network interface 115, and an input interface 117, wherein the processor 113 is electrically connected to the one-dimensional memory space 111, the network interface 115, and the input interface 117. The one-dimensional memory space 111 may be a Static Random Access Memory (SRAM), a Dynamic Random Access Memory (DRAM), a Flash or other memory space well known to those of ordinary skill in the art. The processor 113 may be any of various processors, central processing units (CPUs), microprocessors, or other computing devices well known to those of ordinary skill in the art. The network interface 115 may be a network interface card or other interface that can connect the data processing apparatus 11 to a storage device. The input interface 117 may be a keyboard, a mouse, or other interface that can receive instructions inputted by a user.

In this embodiment, the network interface 115 is electrically connected to a storage device 13 having a piece of recursively structured data 18 stored therein. In some other embodiments, the data processing apparatus 11 may further comprise a storage device having the piece of recursively structured data 18 stored therein. For those embodiments, the network interface 115 may be omitted from the data processing apparatus 11. That is to say, the present invention does not limit the location that the piece of recursively structured data 18 is stored.

In this embodiment, the processor 113 accesses the piece of recursively structured data 18 in the storage device 13 through the network interface 115. The piece of recursively structured data 18 has a Location Independent Structure (LIS). The processor 113 further arranges the piece of recursively structured data 18 in the one-dimensional memory space 111 as the piece of recursively structured data 10 according to the following Equation (1).

$$LIS := e^0 \circ e^1 \circ \ldots \circ e^{p-1} \circ LIS^0 \circ LIS^1 \circ \ldots \circ LIS^{p-1} \qquad (1)$$

In Equation (1), the variable p is a positive integer, the notation $e^i$ represents an element of the piece of recursively structured data 10, the notation $LIS^i$ represents a sub-LIS of the recursively structured data 10 and corresponds to the element $e^i$, the variable i is an index of the elements and is between 0 and p−1, and the operator '$\circ$' indicates "contiguous to" in the one-dimensional memory space 111. By arranging the piece of recursively structured data 10 according to Equation (1), the piece of recursively structured data 10 in the one-dimensional memory space 111 starts with the element $e^0$ adjacent to the element $e^1$, the element $e^1$ adjacent to the element $e^2$, until adjacent to the element $e^{p-1}$, which is adjacent to the sub-LIS $LIS^0$, then adjacent to the sub-LIS $LIS^1$, until adjacent to the sub-LIS $LIS^{p-1}$ as shown in FIG. 1D. The elements $e^0, e^1, \ldots, e^{p-1}$ are sibling elements and the sub-LISs $LIS^0, LIS^1, \ldots, LIS^{p-1}$ are sibling sub-LISs. In this specification, a superscript is used to denote an index of a sibling.

A depth (or level) associated to each of the sub-LISs is a number of recursions from the top LIS. The depth of each sub-LIS (i.e. $LSI^i$) equals the depth of the LIS plus one, while the depth of the top LIS is zero. Each of the sub-LISs is of an LIS size. When the elements in all depths are of the element size (i.e. the element sizes of all the elements are the same) and the LIS sizes of the sub-LISs within the same depth are the same, the piece of recursively structured data 10 is a complete LIS.

Figure 1B:
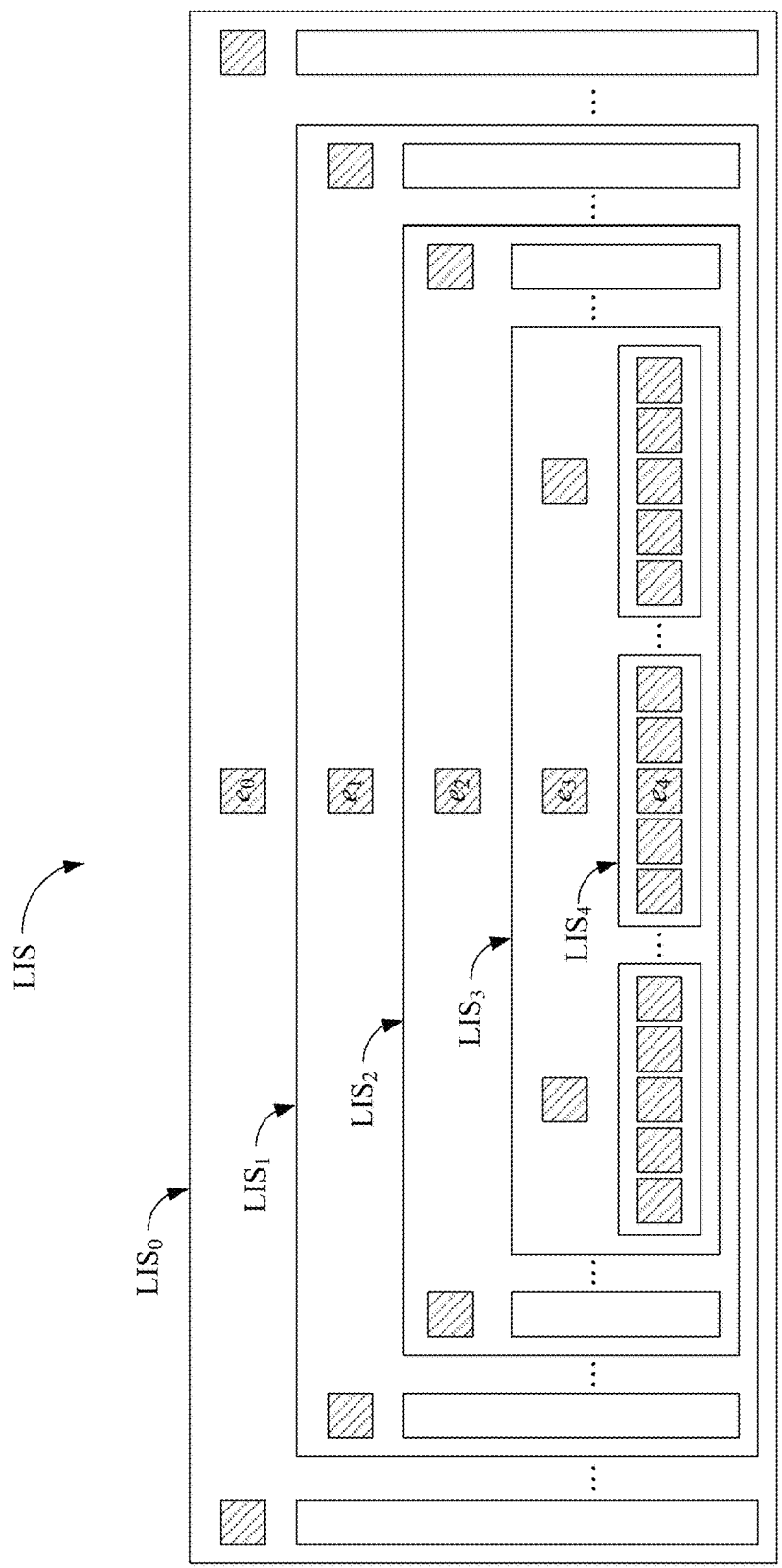
FIG. 1B illustrates an example of the piece of recursively structured data 10.

Please refer to FIG. 1B, which illustrates an example of the LIS for the piece of recursively structured data 10 with maximum depth being 4. A subscript is used to denote a depth in this specification. The piece of recursively structured data 10 is named "X" in this example. In FIG. 1B, the notation $LIS_0$ represents X (i.e. the LIS of depth 0) and the notation $LIS_m$ indicates a sub-LIS of X with depth m. The relations between X, $LIS_0$, and $LIS_m$ can be represented in the following way:

$$LIS_0 = X$$

$$LIS_0 \rightarrow LIS_1 \rightarrow \ldots \rightarrow LIS_m$$

In FIG. 1B, the element $e_m$ indicates one of the elements with depth m or an element of $LIS_m$. The relation between $e_m$ and $LIS_m$ can be represented as "$LIS_m \rightarrow e_m$" wherein the element $e_m$ is selected from the elements of $LIS_m$. Moreover, the element $e_m$ may be located via a path "$LIS_0 \rightarrow e_0 \rightarrow LIS_1 \rightarrow e_1 \rightarrow \ldots \rightarrow e_{m-1} \rightarrow LIS_m \rightarrow e_m$" It is noted that $LIS_m$ is the sub-LIS corresponding to the element $e_{m-1}$.

With the above arrangement, the piece of recursively structured data 10 in the one-dimensional memory space 111 maintains sibling locality and descendant locality. To be more specific, sibling locality means that all sibling elements are placed together in the one-dimensional memory space 111 as one contiguous piece. In addition, descendant locality means that all descendant elements of an element are placed together in the one-dimensional memory space 111 as one contiguous piece.

In some embodiments, the piece of recursively structured data 10 is a complete LIS (i.e. when the elements in all depths are of the element size and the LIS sizes of the sub-LISs within the same depth are the same). The maximum depth of the piece of recursively structured data 10 may be denoted by a variable n, wherein the variable n is a nonnegative integer. The piece of recursively structured data 10 may be denoted as an array in the following Expression (2):

$$LIS\ T\ X[D_0, D_1, D_2, \ldots, D_n] \qquad (2)$$

In Expression (2), the notation X is the name of the piece of recursively structured data 10, the array is of n+1 dimensions (i.e. from the zeroth dimension to the $n^{th}$ dimension), each of the dimensions corresponds to a dimension size, the notation T represents a data type of the elements, the variable $D_j$ represents the dimension size of the j-th dimension, the j-th dimension corresponds to the j-th depth of the piece of recursively structured data 10, and the variable j is an index of the dimension between 0 and n.

When the piece of recursively structured data 10 is denoted as the above array, each of the elements may be denoted as $X[I_0, \ldots, I_m]$ (Expression (3) for short). The variable m is an integer between 0 and n and represents an index corresponding to the m-th dimension, wherein the variable $I_m$ is between 0 and $D_m-1$. The notation $X[I_0]$ is the $I_0$-th element of the LIS, the notation $X[I_0, \ldots, I_{m-1}, I_m]$ is the $I_m$-th element of $LIS_m^{I_{m-1}}$, and the notation $LIS_m^{I_{m-1}}$ represents the $I_{m-1}$-th sub-LIS of the depth m.

Figure 1C:
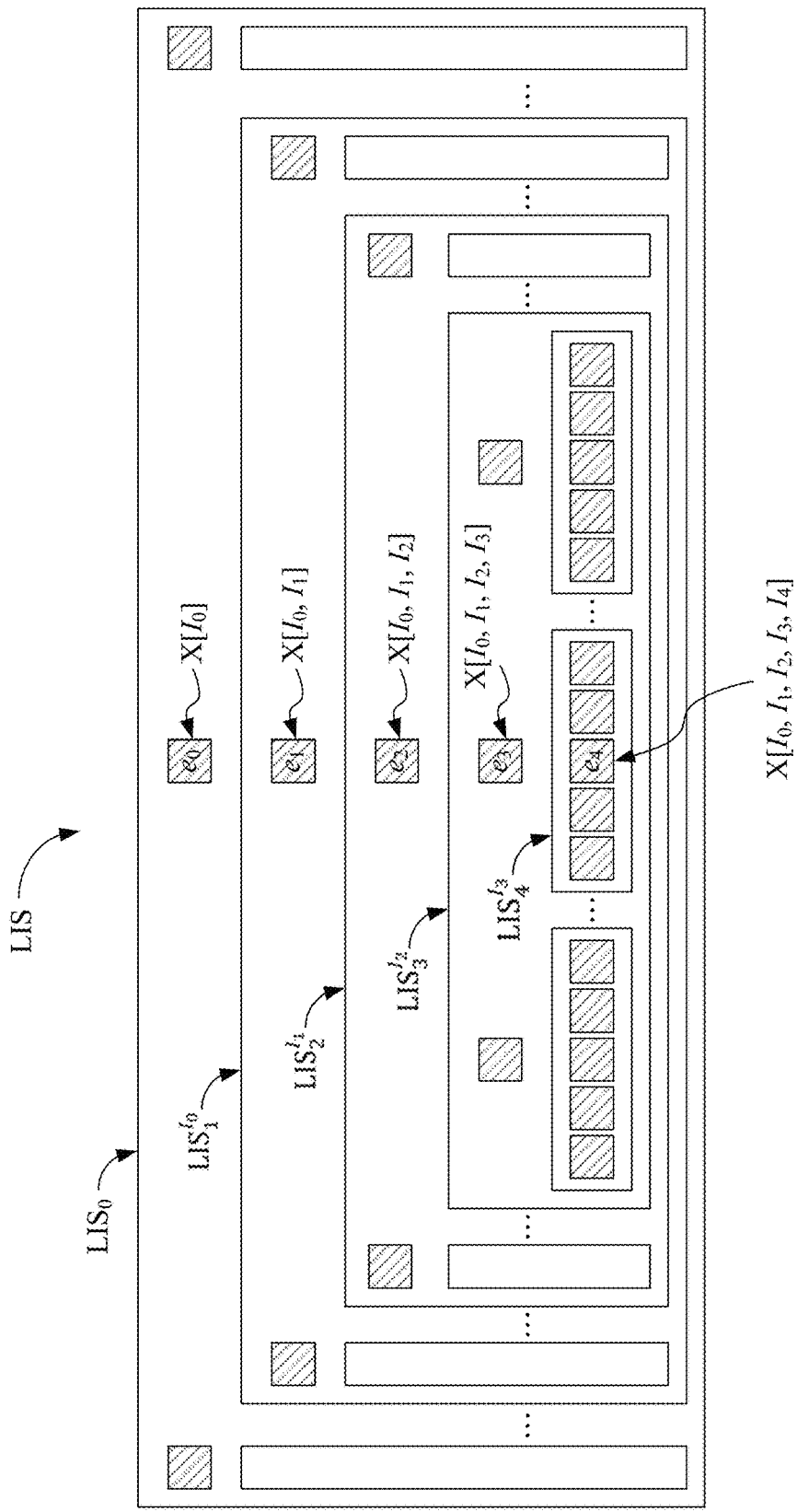
FIG. 1C illustrates an example showing the denotations of the elements and sub-LISs of the piece of recursively structured data 10.
Figure 1D:
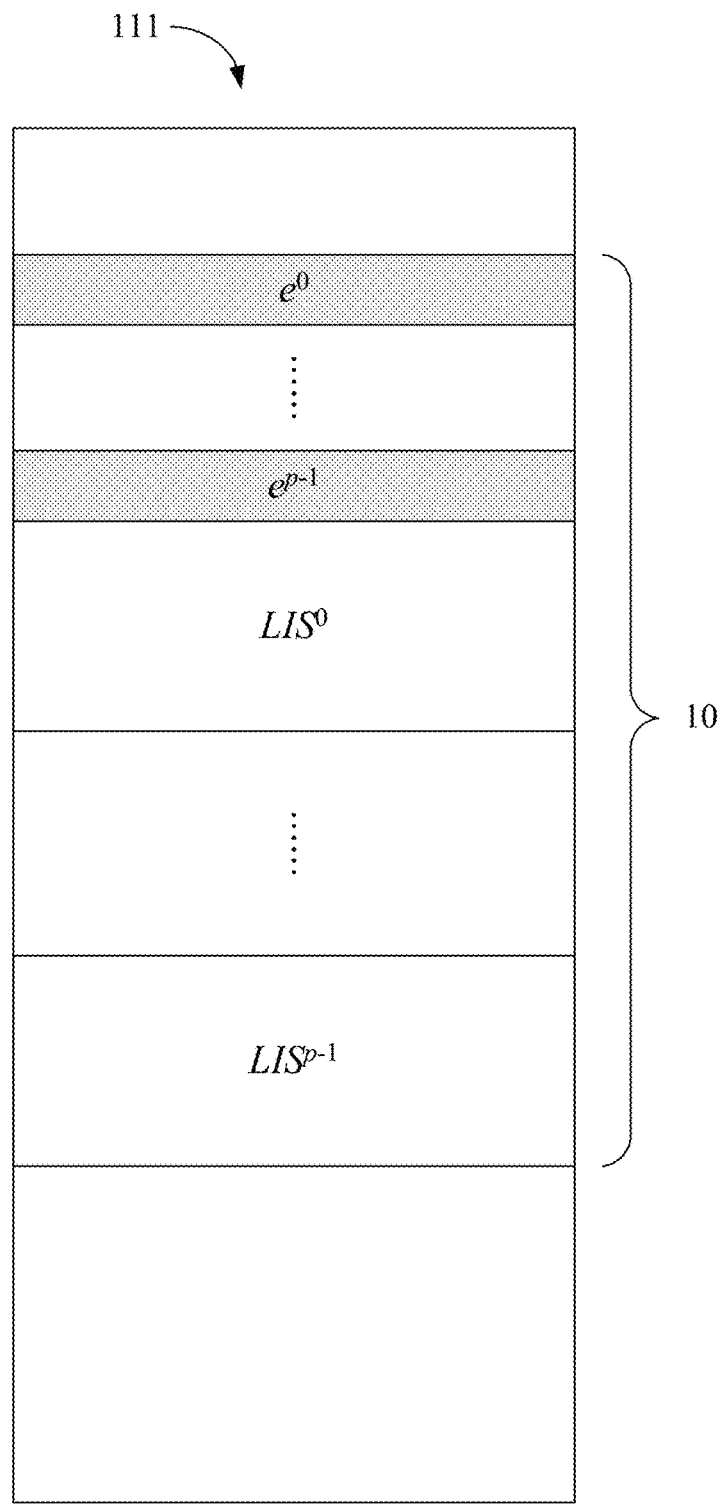
FIG. 1D is a diagram illustrating the contiguous nature of elements $e^0, e^1, \ldots, e^{p-1}$, the contiguous nature of the sub-LISs $LIS^0, LIS^1, \ldots, LIS^{p-1}$, and the contiguous nature of the element $e^{p-1}$ and the sub-LIS $LIS^0$ in the one-dimensional memory space 111.

Please refer to FIG. 1C, which illustrates an example showing the denotations of the elements and sub-LISs of the piece of recursively structured data 10. In this example, the piece of recursively structured data 10 is with maximum depth being 4 and the piece of recursively structured data 10 is named "X." In FIG. 1C, the elements corresponding to $X[I_0]$, $X[I_0, I_1]$, $X[I_0, I_1, I_2]$, $X[I_0, I_1, I_2, I_3]$, and $X[I_0, I_1, I_2, I_3, I_4]$ are labeled and the sub-LISs corresponding to $LIS_0$, $LIS_1^{I_0}$, $LIS_2^{I_1}$, $LIS_3^{I_2}$, and $LIS_4^{I_3}$ are labeled. In some embodiments, the element $X[I_0, \ldots, I_{m-1}, I_m]$ may be further located by the path $LIS \rightarrow X[I_0] \rightarrow LIS_1^{I_0} \rightarrow X[I_0, I_1] \rightarrow LIS_2^{I_1} \rightarrow \ldots \rightarrow X[I_0, \ldots, I_{m-1}] \rightarrow LIS_m^{I_{m-1}} \rightarrow X[I_0, \ldots, I_m]$ (Path (4) for short). The notation $LIS_j^{I_{j-1}}$ represents the sub-LIS corresponding to the element $X[I_0, \ldots, I_{j-1}]$, wherein $0 < 1 \leq m$.

A concrete example is given herein for better understanding. When the piece of recursively structured data 10 is related to sales, the piece of recursively structured data 10 may be denoted by the following array:

LIS Integer Sales[12, 31, 24, 60, 60].

In this example, the name of the piece of recursively structured data 10 is "Sales." The array of the piece of recursively structured data 10 has 5 dimensions, from the zeroth dimension to the fourth dimension. The data type of the elements of the piece of recursively structured data 10 is integer. The zeroth, first, second, third, and fourth dimensions respectively correspond to month, day, hour, minute, and second. The dimension sizes $D_0$, $D_1$, $D_2$, $D_3$, and $D_4$ for the zeroth, first, second, third, and fourth dimensions are respectively 12, 31, 24, 60, and 60. In this way, the LIS Sales can be used to hold the sales values indexed by time—month, day, hour, minute, and second.

For example, Sales[8] (i.e. Sales[$I_0$] with $I_0$ being 8 is the $8^{th}$ element of the LIS Sales) holds an aggregated sales value for September. As another example, Sales[8, 3] (i.e. Sales[$I_0$, $I_1$] with $I_0$ and $I_1$ respectively being 8 and 3 is the third element of $LIS_1^8$ (i.e. $LIS_m^{I_{m-1}} = LIS_1^{I_0} = LIS_1^8$)) holds an aggregated sales value for September $4^{th}$. As another example, Sales[8, 3, 8] (i.e. Sales[$I_0$, $I_1$, $I_2$] with $I_0$, $I_1$, and $I_2$ respectively being 8, 3, and 8 is the $8^{th}$ element of $LIS_2^3$ (i.e. $LIS_m^{I_{m-1}} = LIS_2^{I_1} = LIS_2^3$)) holds an aggregated sales value for September $4^{th}$ 8 am. As another example, Sales[8, 3, 8, 30] (i.e. Sales[$I_0$, $I_1$, $I_2$, $I_3$] with $I_0$, $I_1$, $I_2$, and $I_3$ respectively being 8, 3, 8, and 30 is the 30th element of LIS (i.e. $LIS_m^{I_{m-1}} = LIS_3^{I_2} = LIS_3^8$)) holds an aggregated sales value for September $4^{th}$, 8:30. As another example, Sales[8, 3, 8, 30, 10] (i.e. Sales[$I_0$, $I_1$, $I_2$, $I_3$, $I_4$] with $I_0$, $I_1$, $I_2$, $I_3$, and $I_4$ respectively being 8, 3, 8, 30, and 10 is the 10th element of usr (i.e. $LIS_m^{I_{m-1}} = LIS_4^{I_3} = LIS_4^{30}$)) holds a sales value for September $4^{th}$, 8:30:10.

After the piece of recursively structured data 10 has been arranged in the one-dimensional memory space 111 according to the above Equation (1), the piece of recursively structured data 10 may be retrieved and/or manipulated. As mentioned, the piece of recursively structured data 10 in the one-dimensional memory space 111 maintains sibling locality and descendant locality, so retrieval and manipulation can be achieved efficiently.

In some embodiments, the input interface 117 further receives an instruction 12 for retrieving an element or a sub-LIS of the piece of recursively structured data 10. The instruction 12 comprises an index combination represented as ($I_0, \ldots, I_m$). Then, the processor 113 retrieves the element corresponding to the index combination or the sub-LIS corresponding to the index combination from the one-dimensional memory space 111 according to the following Equations (5), (6), and (7):

$$\begin{cases} S_m = D_m \times (t + S_{m+1}) & \text{for } 0 \leq m \leq n \\ S_m = 0 & \text{for } m > n \end{cases} \qquad (5)$$

-continued $$\begin{cases} X[I_0] = LIS(X) + I_0 \times t \\ X[I_0, \ldots, I_m] = LIS(X[I_0, \ldots, I_{m-1}]) + I_m \times t \quad \text{for } 0 < m \le n \end{cases} \quad (6)$$

$$\begin{cases} LIS(X[I_0]) = LIS(X) + D_0 \times t + I_0 \times S_1 \\ LIS(X[I_0, \ldots, I_m]) = LIS(X[I_0, \ldots, I_{m-1}]) + \\ \quad D_m \times t + I_m \times S_{m+1} \end{cases} \quad \text{for } 0 < m < n \quad (7)$$

In the above Equations (5), (6), and (7), the notation $S_1$ represents the LIS size of the first dimension, the notation $S_m$ represents the LIS size of the $m^{th}$ dimension, the notation $S_{m+1}$ represents the LIS size of the $m+1^{th}$ dimension, the variable t represents the element size, the notation $X[I_0, \ldots, I_m]$ represents the element for the index combination $(I_0, \ldots, I_m)$, the notation $LIS(X)$ represents an offset of the LIS X, the notation $LIS(X[I_0])$ represents an offset of the sub-LIS corresponding to the element $X[I_0]$, the notation $LIS(X[I_0, \ldots, I_{m-1}, I_m])$ represents an offset of the sub-LIS corresponding to the element $X[I_0, \ldots, I_{m-1}, I_m]$, and the notation $LIS(X[I_0, \ldots, I_m])$ represents an offset of the sub-LIS for the index combination $(I_0, \ldots, I_m)$ and corresponds to the element $X[I_0, \ldots, I_m]$.

In some embodiments, LIS is designed to maintain a tree of data. Elements (i.e. intermediate nodes) can be used to store aggregated values such as sum, count, max, min, means, standard deviation, or any function based on data in the child nodes. The input interface 117 further receives an instruction 14 for aggregation. The instruction 14 comprises an index combination represented as $(I_0, \ldots, I_m)$, the variable m is a non-negative integer between zero and n, the notation $I_k$ represents an index corresponding to the $k^{th}$ dimension, and the variable k is an index between 0 and m, The processor 113 then calculates a value for the element corresponding to the index combination by an aggregation function according to the following Equation (8):

$$X[I_0, \ldots, I_m] = \quad (8)$$
$$f(LIS(X[I_0, \ldots, I_m])) = f(X[I_0, \ldots, I_m, 0], X[I_0, \ldots, I_m, 1],$$
$$\ldots, X[I_0, \ldots, I_m, D_{m+1} - 1]) \text{ for } 0 \le m < n$$

In the above Equation (8), the notation $X[I_0, \ldots, I_m]$ represents the element for the index combination $(I_0, \ldots, I_m)$, the notation $f()$ represents the aggregation function, the notation $LIS(X[I_0, \ldots, I_m])$ represents the sub-LIS for the index combination $(I_0, \ldots, I_m)$, the notation $X[I_0, \ldots, I_m, 0]$ represents the element for an index combination $(I_0, \ldots, I_m, 0)$, the notation $X[I_0, \ldots, I_m, 1]$ represents the element for an index combination $(I_0, \ldots, I_m, 1)$, the notation $X[I_0, \ldots, I_m, D_{m+1}-1]$ represents the element for an index combination $(I_0, \ldots, I_m, D_{m+1}-1)$, and the notation $D_{m+1}$ represents the dimension size of the $m+1^{th}$ dimension.

In some embodiments, the input interface 117 further receives an instruction 16 for distribution. The instruction 16 comprises an index combination represented as $(I_0, \ldots, I_m)$, the variable m is a non-negative integer between zero and n, the notation $I_k$ represents an index corresponding to the $k^{th}$ dimension, and the variable k is an index between 0 and m. The processor 113 further calculates a value for the element corresponding to the index combination by a distribution function according to the following Equation (9):

$$(X[I_0, \ldots, I_m, 0], X[I_0, \ldots, I_m, 1], \ldots, X[I_0, \ldots, I_m,$$
$$D_{m+1}-1]) = g(X[I_0, \ldots, I_m]) \text{ for } 0 \le m < n \quad (9)$$

In Equation (9), the notation $X[I_0, \ldots, I_m]$ represents the element for the index combination $(I_0, \ldots, I_m)$, the notation $g()$ represents the distribution function, the notation $X[I_0, \ldots, I_m, 0]$ represents the element for an index combination $(I_0, \ldots, I_m, 0)$, the notation $X[I_0, \ldots, I_m, 1]$ represents the element for an index combination $(I_0, \ldots, I_m, 1)$, the notation $X[I_0, \ldots, I_m, D_{m+1}-1]$ represents the element for an index combination $(I_0, \ldots, I_m, D_{m+1}-1)$, and the notation $D_{m+1}$ represents the dimension size of the $m+1^{th}$ dimension.

According to the above descriptions, the data processing apparatus 11 arranges the piece of recursively structured data 10 in the one-dimensional memory space 111 based on Equation (1). In this way, sibling locality and descendant locality of the piece of recursively structured data 10 are maintained. When the piece of recursively structured data 10 is complete LIS, retrieval and manipulation can be achieved efficiently.

Figure 2A:
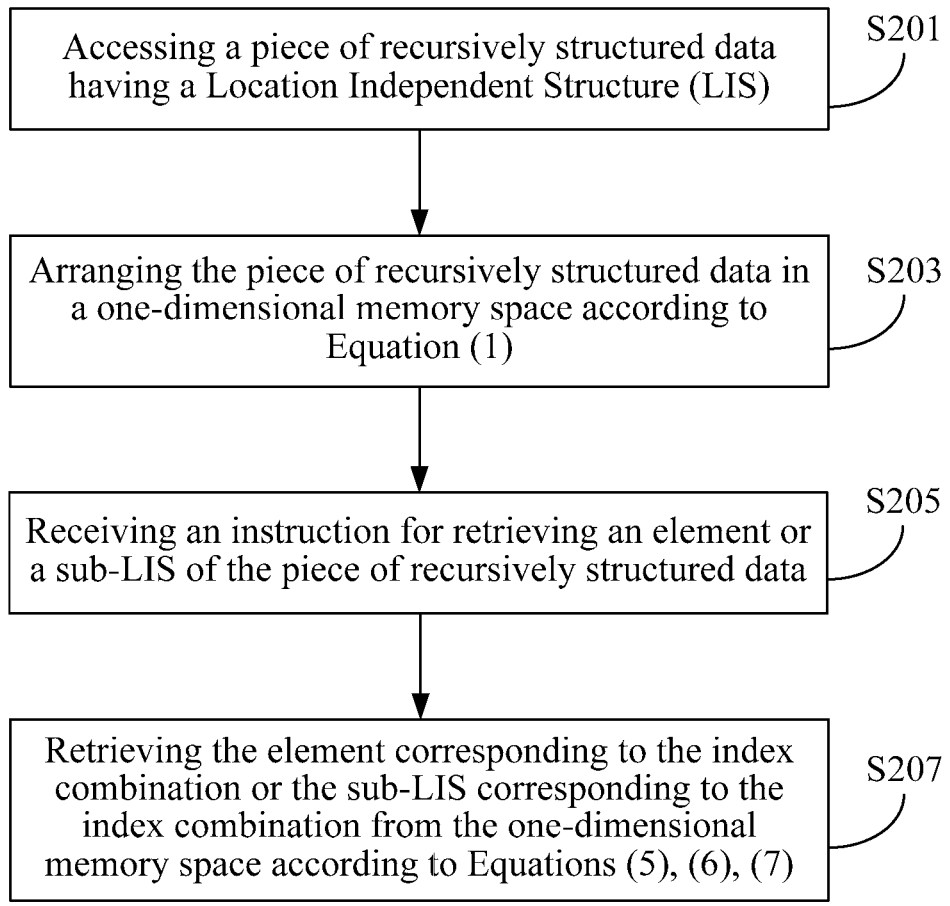
FIG. 2A illustrates the flowchart for the data processing method of the second embodiment.

A second embodiment of the present invention is a data processing method for use in an electronic apparatus (e.g. the data processing apparatus 11 of the first embodiment). The flowchart of the second embodiment is illustrated in FIG. 2A. The data processing method is able to arrange a piece of recursively structured data in a one-dimensional memory space in a way that sibling locality and descendant locality are maintained.

To achieve that, step S201 is executed by the electronic apparatus for accessing a piece of recursively structured data. The piece of recursively structured data has a Location Independent Structure (LIS). The piece of recursively structured data may be stored within the electronic apparatus or external to the electronic apparatus. Next, step S203 is executed by the electronic apparatus for arranging the piece of recursively structured data in a one-dimensional memory space according to the above Equation (1). For the details of Equation (1), please refer to the descriptions in the first embodiment.

When the piece of recursively structured data is a complete LIS (i.e. when the elements in all depths are of the element size and the LIS sizes of the sub-LISs within the same depth are the same), the piece of recursively structured data may be denoted as an array by the above Expression (2) and each of the elements may be denoted by the above Expression (3). In addition, an element $X[I_0, \ldots, I_{m-1}, I_m]$ may be located by the above Path (4).

In some embodiments, step S205 is executed by the electronic apparatus for receiving an instruction for retrieving an element or a sub-LIS of the piece of recursively structured data. The instruction comprises an index combination represented as $(I_0, \ldots, I_m)$. Then, step S207 is executed by the electronic apparatus for retrieving the element corresponding to the index combination or the sub-LIS corresponding to the index combination from the one-dimensional memory space according to the above Equations (5), (6), and (7).

Figure 2B:
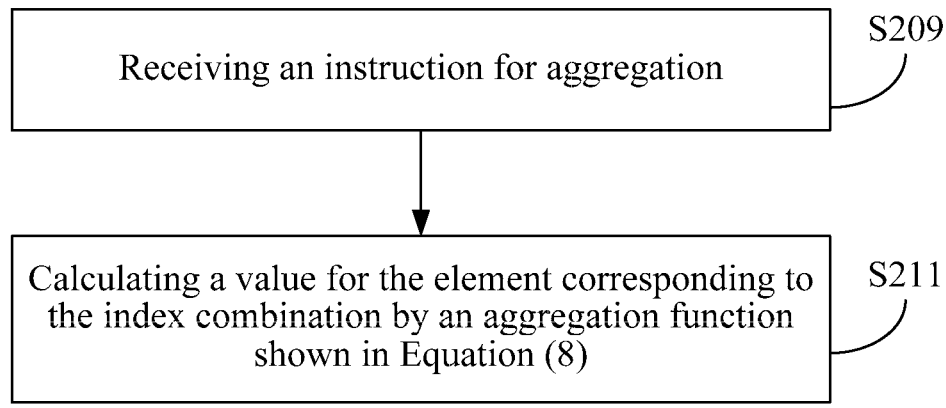
FIG. 2B illustrates the steps for aggregation.

In some embodiments, LIS is designed to maintain a tree of data. Elements (i.e. intermediate nodes) can be used to store aggregated values such as sum, count, max, min, means, standard deviation, or any function based on data in the child nodes. For those embodiments, the data processing method may further execute the steps illustrated in FIG. 2B for aggregation. In step S209, the electronic apparatus receives an instruction for aggregation. The instruction comprises an index combination represented as $(I_0, \ldots, I_m)$. In step S211, the electronic apparatus calculates a value for the element corresponding to the index combination by an aggregation function, which is the above Equation (8).

Figure 2C:
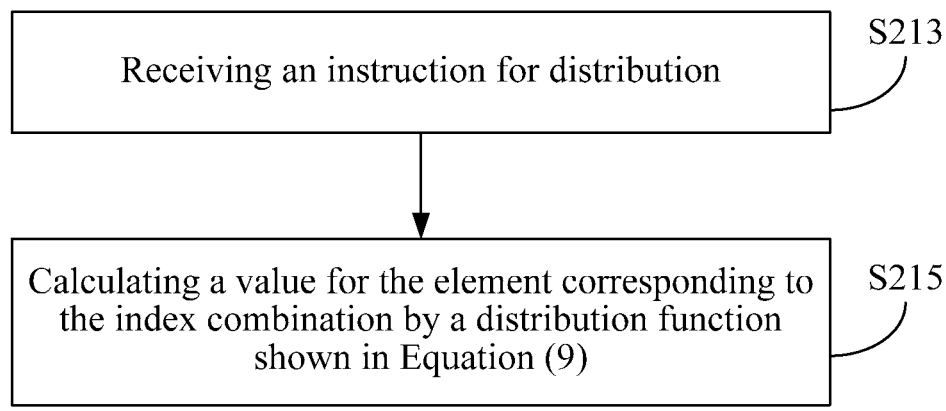
FIG. 2C illustrates the steps for distribution.

In some embodiments, the data processing method may further execute the steps illustrated in FIG. 2C for distribution. In step S213, the electronic apparatus receives an instruction for distribution. The instruction comprises an index combination represented as $(I_0, \ldots, I_m)$. Next, in step S215, the electronic apparatus for calculates a value for the element corresponding to the index combination by a distribution function shown in Equation (9).

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

The data processing method described in the second embodiment may be implemented as a computer program. When the computer program is loaded into an electronic apparatus, a plurality of codes comprised in the computer program are able to perform method for querying a database of the second and third embodiments. This computer program may be stored in a non-transitory tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

The present invention arranges a piece of recursively structured data in a one-dimensional memory space based on a specific way (i.e. $LIS := e^0 \circ e^1 \circ \ldots \circ e^{p-1} \circ LIS^0 \circ LIS^1 \circ \ldots \circ LIS^{p-1}$. Therefore, sibling locality (i.e. all sibling elements are placed together in the one-dimensional memory space as one contiguous piece) and descendant locality (i.e. all descendant elements of an element are placed together in the one-dimensional memory space as one contiguous piece) of the piece of recursively structured data 10 are maintained. As a result, retrieval and manipulation can be achieved efficiently, especially when the piece of recursively structured data is complete LIS.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data processing apparatus, comprising:
   a one-dimensional memory space; and
   a processor, being electrically connected to the one-dimensional memory space and configured to access a piece of recursively structured data, wherein the piece of recursively structured data has a Location Independent Structure (LIS),
   wherein the processor further arranges the piece of recursively structured data in the one-dimensional memory space in the following way:

$LIS := e^0 \circ e^1 \circ \ldots \circ e^{p-1} \circ LIS^0 \circ LIS^1 \circ \ldots \circ LIS^{p-1}$, wherein the variable p is a positive integer, the notation $e^i$ represents an element of the piece of recursively structured data, the notation $LIS^i$ represents a sub-LIS of the recursively structured data and corresponds to the element $e^i$, the variable i is an index of the elements and is between 0 and p−1, the operator '$\circ$' indicates "contiguous to" in the one-dimensional memory space, each of the sub-LISs is of an LIS size, a depth associated to each sub-LIS is a number of recursions from the top LIS, the depth of each $LIS^i$ equals the depth of the LIS plus one, and the depth of the top LIS is zero,
   wherein each of the elements is of an element size, the element sizes are the same, and the LIS sizes of the sub-LISs within the same depth are the same,
   wherein the piece of recursively structured data arranged in the one-dimensional memory space defines an array as LIS T X $[D_0, D_1, D_2, \ldots, D_n]$,
   wherein X is the name of the piece of recursively structured data, the variable n is the maximum LIS depth and is a nonnegative integer, the array is of n+1 dimensions, each of the dimensions corresponds to a dimension size, the notation T represents a data type of the elements, the variable $D_j$ represents the dimension size of the j-th dimension, the j-th dimension corresponds to the j-th depth of the piece of recursively structured data, and the variable j is an index of the dimension between 0 and n,
   wherein each of the elements is denoted as $X[I_0, \ldots, I_m]$, the variable m is an integer between 0 and n, the variable $I_m$ represents an index corresponding to the m-th dimension, $I_m$, is between 0 and $D_m-1$, the notation $X[I_0]$ is the $I_0$-th element of the LIS, the notation $X[I_0, \ldots, I_{m-1}, I_m]$, is the $I_m$-th element of $LIS_m^{I_{m-1}}$, and the notation $LIS_m^{I_{m-1}}$ represents the $I_{m-1}$-th sub-LIS of the depth m.

2. The data processing apparatus of claim 1, wherein the element $X[I_0, \ldots, I_{m-1}, I_m]$ is located by the following path:

$LIS \to X[I_0] \to LIS_1^{I_0} \to X[I_0, I_1] \to LIS_2^{I_1} \to \ldots \to X[I_0, \ldots, I_{m-1}] \to LIS_m^{I_{m-1}} \to X[I_0, \ldots, I_m]$, wherein the notation $LIS_j^{I_{j-1}}$ represents the sub-LIS corresponding to the element $X[I_0, \ldots, I_{j-1}]$ and $0 < j \leq m$.

3. The data processing apparatus of claim 1, further comprising:
   an input interface, being electrically connected to the processor and configured to receive an instruction comprising an index combination, wherein the index combination is represented as $(I_0, \ldots, I_m)$,
   wherein the processor further retrieves the element corresponding to the index combination and the sub-LIS corresponding to the index combination from the one-dimensional memory space according to the following equations:

$$\begin{cases} S_m = D_m \times (t + S_{m+1}) & \text{for } 0 \leq m \leq n \\ S_m = 0 & \text{for } m > n \end{cases},$$

$$\begin{cases} X[I_0] = LIS(X) + I_0 \times t \\ X[I_0, \ldots, I_m] = LIS(X[I_0, \ldots, I_{m-1}]) + I_m \times t & \text{for } 0 < m \leq n \end{cases}, \text{ and}$$

$$\begin{cases} LIS(X[I_0]) = LIS(X) + D_0 \times t + I_0 \times S_1 \\ LIS(X[I_0, \ldots, I_m]) = LIS(X[I_0, \ldots, I_{m-1}]) + \\ \quad D_m \times t + I_m \times S_{m+1} \end{cases} \text{ for } 0 < m < n,$$

wherein the notation $S_1$ represents the LIS size of the first dimension, the notation $S_m$ represents the LIS size of the $m^{th}$ dimension, the notation $S_{m+1}$ represents the LIS size of the $m+1^{th}$ dimension, the variable t represents the element size, the notation $X[I_0, \ldots, I_m]$ represents the element for the index combination $(I_0, \ldots, I_m)$, the notation LIS(X) represents an offset of the LIS X, the notation LIS(X[$I_0$]) represents an offset of the sub-LIS corresponding to the element X[$I_0$], the notation LIS (X[$I_0, \ldots, I_{m-1}, I_m$]) represents an offset of the sub-LIS corresponding to the element X[$I_0, \ldots, I_{m-1}, I_m$], and the notation LIS(X[$I_0, \ldots, I_m$]) represents an offset of the sub-LIS for the index combination ($I_0, \ldots, I_m$) and corresponds to the element X[$I_0, \ldots, I_m$].

4. The data processing apparatus of claim 1, further comprising:
an input interface, being electrically connected to the processor and configured to receive an instruction comprising an index combination, wherein the index combination is represented as ($I_0, \ldots, I_m$), the variable m is a non-negative integer between zero and n, the notation $I_k$ represents an index corresponding to the $k^{th}$ dimension, and the variable k is an index between 0 and m,
wherein the processor calculates a value for the element corresponding to the index combination by an aggregation function according to the following equation:

$$X[I_0, \ldots, I_m] = f(LIS(X[I_0, \ldots, I_m])) = f(X[I_0, \ldots, I_m, 0], X[I_0, \ldots, I_m, 1],$$
$$\ldots, X[I_0, \ldots, I_m, D_{m+1} - 1]) \text{ for } 0 \le m < n,$$

wherein the notation X[$I_0, \ldots, I_m$] represents the element for the index combination ($I_0, \ldots, I_m$), the notation f( ) represents the aggregation function, the notation LIS(X[$I_0, \ldots, I_m$]) represents the sub-LIS for the index combination ($I_0, \ldots, I_m$), the notation X[$I_0, \ldots, I_m$, 0] represents the element for an index combination ($I_0, \ldots, I_m$, 0), the notation X[$I_0, \ldots, I_m$, 1] represents the element for an index combination ($I_0, \ldots, I_m$, 1), the notation X[$I_0, \ldots, I_m, D_{m+1}-1$] represents the element for an index combination ($I_0, \ldots, I_m, D_{m+1}-1$), and the notation $D_{m+1}$ represents the dimension size of the m+$1^{th}$ dimension.

5. The data processing apparatus of claim 1, further comprising:
an input interface, being electrically connected to the processor and configured to receive an instruction comprising an index combination, wherein the index combination is represented as ($I_0, \ldots, I_m$), the variable m is a non-negative integer between zero and n, the notation $I_k$ represents an index corresponding to the $k^{th}$ dimension, and the variable k is an index between 0 and m,
wherein the processor calculates a value for the element corresponding to the index combination by a distribution function according to the following equation:

$$(X[I_0, \ldots, I_m, 0], X[I_0, \ldots, I_m, 1], \ldots, X[I_0, \ldots, I_m, D_{m+1}-1]) = g(X[I_0, \ldots, I_m]) \text{ for } 0 \le m < n'$$

wherein the notation X[$I_0, \ldots, I_m$] represents the element for the index combination ($I_0, \ldots, I_m$), the notation g( ) represents the distribution function, the notation X[$I_0, \ldots, I_m$, 0] represents the element for an index combination ($I_0, \ldots, I_m$, 0), the notation X[$I_0, \ldots, I_m$, 1] represents the element for an index combination ($I_0, \ldots, I_m$, 1), the notation X[$I_0, \ldots, I_m, D_{m+1}-1$] represents the element for an index combination ($I_0, \ldots, I_m, D_{m+1}-1$), and the notation $D_{m+1}$ represents the dimension size of the m+$1^{th}$ dimension.

6. A data processing method for use in an electronic apparatus, comprising the following steps of:
accessing a piece of recursively structured data, wherein the piece of recursively structured data has a Location Independent Structure (LIS); and
arranging the piece of recursively structured data in a one-dimensional memory space in the following way:

$$LIS := e^0 \circ e^1 \circ \ldots \circ e^{p-1} \circ LIS^0 \circ LIS^1 \ldots \circ LIS^{p-1},$$

wherein the variable p is a positive integer, the notation $e^i$ represents an element of the piece of recursively structured data, the notation $LIS^i$ represents a sub-LIS of the recursively structured data and corresponds to the element $e^i$, the variable i is an index of the elements and is between 0 and p−1, the operator '∘' indicates "contiguous to" in the one-dimensional memory space, each of the sub-LISs is of an LIS size, a depth associated to each sub-LIS is a number of recursions from the top LIS, the depth of each of the $LIS^i$ equals the depth of the LIS plus one, and the depth of the top LIS is zero,
wherein each of the elements is of an element size, the element sizes are the same, and the LIS sizes of the sub-LISs within the same depth are the same,
wherein the piece of recursively structured data arranged in the one-dimensional memory space defines an array as LIS T X[$D_0, D_1, D_2, \ldots, D_n$],
wherein X is the name of the piece of recursively structured data, the variable n is the maximum LIS depth and is a nonnegative integer, the array is of n+1 dimensions, each of the dimensions corresponds to a dimension size, the notation T represents a data type of the elements, the variable $D_j$ represents the dimension size of the j-th dimension, the j-th dimension corresponds to the j-th depth of the piece of recursively structured data, and the variable j is an index of the dimension between 0 and n,
wherein each of the elements is denoted as X[$I_0, \ldots, I_m$], the variable m is an integer between 0 and n, the variable $I_m$ represents an index corresponding to the m-th dimension, $I_m$ is between 0 and $D_m-1$, the notation X[$I_0$] is the $I_0$-th element of the LIS, the notation X[$I_0, \ldots, I_{m-1}, I_m$] is the $I_m$-th element of $LIS_m^{I_{m-1}}$, and the notation $LIS_m^{I_{m-1}}$ represents the $I_{m-1}$-th sub-LIS of the depth m.

7. The data processing method of claim 6, wherein the element X[$I_0, \ldots, I_{m-1}, I_m$] is located by the following path:

$$LIS \to X[I_0] \to LIS_1^{I_0} \to X[I_0, I_1] \to LIS_2^{I_1} \to \ldots \to$$
$$X[I_0, \ldots, I_{m-1}] \to LIS_m^{I_{m-1}} \to X[I_0, \ldots, I_m],$$

wherein the notation $LIS_j^{I_{j-1}}$ represents the sub-LIS corresponding to the element X[$I_0, \ldots, I_{j-1}$] and 0<j≤m.

8. The data processing method of claim 6, further comprising the following steps of:
receiving an instruction comprising an index combination, wherein the index combination is represented as ($I_0, \ldots, I_m$); and
retrieving the element corresponding to the index combination and the sub-LIS corresponding to the index combination from the one-dimensional memory space according to the following equations:

$$\begin{cases} S_m = D_m \times (I + S_{m+1}) & \text{for } 0 \le m \le n \\ S_m = 0 & \text{for } m > n \end{cases},$$

-continued $$\begin{cases} X[I_0] = LIS(X) + I_0 \times t \\ X[I_0, \ldots, I_m] = LIS(X[I_0, \ldots, I_{m-1}]) + I_m \times t \quad \text{for } 0 < m \leq n \end{cases}, \text{ and}$$

$$\begin{cases} LIS(X[I_0]) = LIS(X) + D_0 \times t + I_0 \times S_1 \\ LIS(X[I_0, \ldots, I_m]) = LIS(X[I_0, \ldots, I_{m-1}]) + \\ \qquad D_m \times t + I_m \times S_{m+1} \end{cases} \text{for } 0 < m < n,$$

wherein the notation $S_1$ represents the LIS size of the first dimension, the notation $S_m$ represents the LIS size of the $m^{th}$ dimension, the notation $S_{m+1}$ represents the LIS size of the $m+1^{th}$ dimension, the variable t represents the element size, the notation $X[I_0, \ldots, I_m]$ represents the element for the index combination $(I_0, \ldots, I_m)$, the notation LIS(X) represents an offset of the LIS X, the notation $LIS(X[I_0])$ represents an offset of the sub-LIS corresponding to the element $X[I_0]$, the notation LIS $(X[I_0, \ldots, I_{m-1}, I_m])$ represents an offset of the sub-LIS corresponding to the element $X[I_0, \ldots, I_{m-1}, I_m]$, and the notation $LIS(X[I_0, I_m])$ represents an offset of the sub-LIS for the index combination $(I_0, \ldots, I_m)$ and corresponds to the element $X[I_0, \ldots, I_m]$.

9. The data processing method of claim 6, further comprising the following step of:
receiving an instruction comprising an index combination, wherein the index combination is represented as $(I_0, \ldots, I_m)$, the variable m is a non-negative integer between zero and n, the notation $I_k$ represents an index corresponding to the $k^{th}$ dimension, and the variable k is an index between 0 and m; and
calculating a value for the element corresponding to the index combination by an aggregation function according to the following equation:

$$X[I_0, \ldots, I_m] = \\ f(LIS(X[I_0, \ldots, I_m])) = f(X[I_0, \ldots, I_m, 0], X[I_0, \ldots, I_m, 1], \\ \ldots, X[I_0, \ldots, I_m, D_{m+1} - 1]) \text{ for } 0 \leq m < n,$$

wherein the notation $X[I_0, \ldots, I_m]$ represents the element for the index combination $(I_0, \ldots, I_m)$, the notation f( ) represents the aggregation function, the notation $LIS(X[I_0, \ldots, I_m])$ represents the sub-LIS for the index combination $(I_0, \ldots, I_m)$, the notation $X[I_0, \ldots, I_m, 0]$ represents the element for an index combination $(I_0, \ldots, I_m, 0)$, the notation $X[I_0, \ldots, I_m, 1]$ represents the element for an index combination $(I_0, \ldots, I_m, 1)$, the notation $X[I_0, \ldots, I_m, D_{m+1}-1]$ represents the element for an index combination $(I_0, \ldots, I_m, D_{m+1}-1)$, and the notation $D_{m+1}$ represents the dimension size of the $m+1^{th}$ dimension.

10. The data processing method of claim 6, further comprising the following step of:
receiving an instruction comprising an index combination, wherein the index combination is represented as $(I_0, \ldots, I_m)$, the variable m is a non-negative integer between zero and n, the notation $I_k$ represents an index corresponding to the $k^{th}$ dimension, and the variable k is an index between 0 and m; and
calculates a value for the element corresponding to the index combination by a distribution function according to the following equation:

$$(X[I_0, \ldots, I_m, 0], X[I_0, \ldots, I_m, 1], \ldots, X[I_0, \ldots, I_m, D_{m+1}-1]) = g(X[I_0, \ldots, I_m]) \text{ for } 0 \leq m < n,$$

wherein the notation $X[I_0, \ldots, I_m]$ represents the element for the index combination $(I_0, \ldots, I_m)$, the notation g( ) represents the distribution function, the notation $X[I_0, \ldots, I_m, 0]$ represents the element for an index combination $(I_0, \ldots, I_m, 0)$, the notation $X[I_0, \ldots, I_m, 1]$ represents the element for an index combination $(I_0, \ldots, I_m, 1)$, the notation $X[I_0, \ldots, I_m, D_{m+1}-1]$ represents the element for an index combination $(I_0, \ldots, I_m, D_{m+1}-1)$, and the notation $D_{m+1}$ represents the dimension size of the $m+1^{th}$ dimension.

11. A non-transitory tangible machine-readable medium, being stored with a computer program, the computer program comprising a plurality of codes, the codes being able to execute a data processing method when the computer program is loaded into an electronic apparatus, the data processing method comprising the steps of:
accessing a piece of recursively structured data, wherein the piece of recursively structured data has a Location Independent Structure (LIS); and
arranging the piece of recursively structured data in an LIS in a one-dimensional memory space in the following way:

$$LIS := e^0 \circ e^1 \circ \ldots \circ e^{p-1} \circ LIS^0 \circ LIS^1 \circ \ldots \circ LIS^{p-1},$$

wherein the variable p is a positive integer, the notation $e^i$ represents an element of the piece of recursively structured data, the notation $LIS^i$ represents a sub-LIS of the recursively structured data and corresponds to the element $e^i$, the variable i is an index of the elements and is between 0 and p−1, the operator '∘' indicates "contiguous to" in the one-dimensional memory space, each of the sub-LISs is of an LIS size, a depth associated to each sub-LIS is a number of recursions from the top LIS, the depth of each of the $LIS^i$ equals the depth of the LB plus one, and the depth of the top LIS is zero,
wherein each of the elements is of an element size, the element sizes are the same, and the LB sizes of the sub-LISs within the same depth are the same,
wherein the piece of recursively structured data arranged in the one-dimensional memory space defines an array as LIS T $X[D_0, D_1, D_2, \ldots, D_n]$,
wherein X is the name of the piece of recursively structured data, the variable n is the maximum LIS depth and is a nonnegative integer, the array is of n+1 dimensions, each of the dimensions corresponds to a dimension size, the notation T represents a data type of the elements, the variable $D_j$ represents the dimension size of the j-th dimension, the j-th dimension corresponds to the j-th depth of the piece of recursively structured data, and the variable j is an index of the dimension between 0 and n,
wherein each of the elements is denoted as $X[I_0, \ldots, I_m]$, the variable m is an integer between 0 and n, the variable $I_m$ represents an index corresponding to the m-th dimension, $I_m$ is between 0 and $D_m-1$, the notation $X[I_0]$ is the $I_0$-th element of the LIS, the notation $X[I_0, \ldots, I_{m-1}, I_m]$ is the $I_m$-th element of $LIS_m^{I_{m-1}}$, and the notation $LIS_m^{I_{m-1}}$ represents the $I_{m-1}$-th sub-LIS of the depth m.

12. The non-transitory tangible machine-readable medium of claim 11, wherein the element $X[I_0, \ldots, I_{m-1}, I_m]$ is located by the following path:

$$LIS \to X[I_0] \to LIS_1^{I_0} \to X[I_0, I_1] \to LIS_2^{I_1} \to \ldots \to \\ X[I_0, \ldots, I_{m-1}] \to LIS_m^{I_{m-1}} \to X[I_0, \ldots, I_m],$$

wherein the notation $LIS_j^{I_{j-1}}$ represents the sub-LIS corresponding to the element $X[I_0, \ldots, I_{j-1}]$ and $0 < j \le m$.

13. The non-transitory tangible machine-readable medium of claim 11, wherein the data processing method further comprises the following steps of:
   receiving an instruction comprising an index combination, wherein the index combination is represented as $(I_0, \ldots, I_m)$; and
   retrieving the element corresponding to the index combination and the sub-LIS corresponding to the index combination from the one-dimensional memory space according to the following equations:

$$\begin{cases} S_m = D_m \times (t + S_{m+1}) & \text{for } 0 \le m \le n \\ S_m = 0 & \text{for } m > n \end{cases},$$

$$\begin{cases} X[I_0] = LIS(X) + I_0 \times t \\ X[I_0, \ldots, I_m] = LIS(X[I_0, \ldots, I_{m-1}]) + I_m \times t & \text{for } 0 < m \le n \end{cases}, \text{ and}$$

$$\begin{cases} LIS(X[I_0]) = LIS(X) + D_0 \times t + I_0 \times S_1 \\ LIS(X[I_0, \ldots, I_m]) = LIS(X[I_0, \ldots, I_{m-1}]) + \\ \quad D_m \times t + I_m \times S_{m+1} \end{cases} \text{ for } 0 < m < n,$$

wherein the notation $S_1$ represents the LIS size of the first dimension, the notation $S_m$ represents the LIS size of the $m^{th}$ dimension, the notation $S_{m+1}$ represents the LIS size of the $m+1^{th}$ dimension, the variable t represents the element size, the notation $X[I_0, \ldots, I_m]$ represents the element for the index combination $(I_0, \ldots, I_m)$, the notation $LIS(X)$ represents an offset of the LIS X, the notation $LIS(X[I_0])$ represents an offset of the sub-LIS corresponding to the element $X[I_0]$, the notation $LIS(X[I_0, \ldots, I_{m-1}, I_m])$ represents an offset of the sub-LIS corresponding to the element $X[I_0, \ldots, I_{m-1}, I_m]$, and the notation $LIS(X[I_0, \ldots, I_m])$ represents an offset of the sub-LIS for the index combination $(I_0, \ldots, I_m)$ and corresponds to the element $X[I_0, \ldots, I_m]$.

14. The non-transitory tangible machine-readable medium of claim 11, wherein the data processing method further comprises the following step of:
   receiving an instruction comprising an index combination, wherein the index combination is represented as $(I_0, \ldots, I_m)$, the variable m is a non-negative integer between zero and n, the notation $I_k$ represents an index corresponding to the $k^{th}$ dimension, and the variable k is an index between 0 and m; and
   calculating a value for the element corresponding to the index combination by an aggregation function according to the following equation:

$$X[I_0, \ldots, I_m] =$$
$$f(LIS(X[I_0, \ldots, I_m])) = f(X[I_0, \ldots, I_m, 0], X[I_0, \ldots, I_m, 1],$$
$$\ldots, X[I_0, \ldots, I_m, D_{m+1} - 1]) \text{ for } 0 \le m < n,$$

wherein the notation $X[I_0, \ldots, I_m]$ represents the element for the index combination $(I_0, \ldots, I_m)$, the notation $f(\,)$ represents the aggregation function, the notation $LIS(X[I_0, \ldots, I_m])$ represents the sub-LIS for the index combination $(I_0, \ldots, I_m)$, the notation $X[I_0, \ldots, I_m, 0]$ represents the element for an index combination $(I_0, \ldots, I_m, 0)$, the notation $X[I_0, \ldots, I_m, 1]$ represents the element for an index combination $(I_0, \ldots, I_m, 1)$, the notation $X[I_0, \ldots, I_m, D_{m+1}-1]$ represents the element for an index combination $(I_0, \ldots, I_m, D_{m+1}-1)$, and the notation $D_{m+1}$ represents the dimension size of the $m+1^{th}$ dimension.

15. The non-transitory tangible machine-readable medium of claim 11, wherein the data processing method further comprises the following step of:
   receiving an instruction comprising an index combination, wherein the index combination is represented as $(I_0, \ldots, I_m)$, the variable m is a non-negative integer between zero and n, the notation $I_k$ represents an index corresponding to the $k^{th}$ dimension, and the variable k is an index between 0 and m; and
   calculates a value for the element corresponding to the index combination by a distribution function according to the following equation:

$$(X[I_0, \ldots, I_m, 0], X[I_0, \ldots, I_m, 1], \ldots, X[I_0, \ldots, I_m,$$
$$D_{m+1}-1]) = g(X[I_0, \ldots, I_m]) \text{ for } 0 \le m < n',$$

wherein the notation $X[I_0, \ldots, I_m]$ represents the element for the index combination $(I_0, \ldots, I_m)$, the notation $g(\,)$ represents the distribution function, the notation $X[I_0, \ldots, I_m, 0]$ represents the element for an index combination $(I_0, \ldots, I_m, 0)$, the notation $X[I_0, \ldots, I_m, 1]$ represents the element for an index combination $(I_0, \ldots, I_m, 1)$, the notation $X[I_0, \ldots, I_m, D_{m+1}-1]$ represents the element for an index combination $(I_0, \ldots, I_m, D_{m+1}-1)$, and the notation $D_{m+1}$ represents the dimension size of the $m+1^{th}$ dimension.

* * * * *